(12) United States Patent
Lin et al.

(10) Patent No.: US 12,524,414 B2
(45) Date of Patent: Jan. 13, 2026

(54) DATABASE CIRCUIT AND DATA MATCHING METHOD

(71) Applicant: MACRONIX INTERNATIONAL CO., LTD., Hsinchu (TW)

(72) Inventors: Yu-Hsuan Lin, Taichung (TW); Yu-Yu Lin, New Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 9 days.

(21) Appl. No.: 18/664,373

(22) Filed: May 15, 2024

(65) Prior Publication Data

US 2025/0355882 A1    Nov. 20, 2025

(51) Int. Cl.
*G06F 16/245* (2019.01)
*G06F 16/248* (2019.01)

(52) U.S. Cl.
CPC ...... *G06F 16/24569* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 7,676,034 B1* | 3/2010 | Wu | ........... | H04M 3/42068 379/265.11 |
| 8,477,773 B2* | 7/2013 | Sundstrom | ........... | H04L 47/2441 341/51 |
| 9,456,086 B1* | 9/2016 | Wu | ........... | H04M 3/5233 |
| 9,690,840 B2* | 6/2017 | Cialdea, Jr. | ........... | G06F 16/283 |
| 9,860,391 B1* | 1/2018 | Wu | ........... | H04M 15/8061 |
| 10,162,759 B2 | 12/2018 | Shen et al. | | |
| 11,586,848 B2 | 2/2023 | Yun et al. | | |

(Continued)

FOREIGN PATENT DOCUMENTS

| | | |
|---|---|---|
| CN | 105893275 A | 8/2016 |
| CN | 110852432 A | 2/2020 |
| TW | 202141497 A | 11/2021 |

OTHER PUBLICATIONS

Query From Examples: An Iterative, Data-Driven Approach to Query Construction (Year: 2015).*

(Continued)

*Primary Examiner* — Kim T Nguyen
(74) *Attorney, Agent, or Firm* — McClure, Qualey & Rodack, LLP

(57) ABSTRACT

A database circuit comprising data circuits and a processing circuit is provided. The data circuits are configured to receive a query data and respectively store a plurality of feature data that form at least one feature data class. The processing circuit is coupled to the data circuits, and configured to match the query data with the feature data to generate matching signals and take a first reference value as a target reference value to compare the matching signals with the target reference value. When at least one of the matching signals is greater than or equal to the target reference value, the processing circuit selects one of the at least one feature data class as a matching result; otherwise, the processing circuit takes a second reference value lower than the first reference value as the target reference value to compare the matching signals with the target reference value.

18 Claims, 16 Drawing Sheets

(56) References Cited

U.S. PATENT DOCUMENTS

| | | | |
|---|---|---|---|
| 11,726,994 B1* | 8/2023 | Wang | G06F 16/24573 |
| | | | 707/769 |
| 2010/0238922 A1* | 9/2010 | Sundstrom | H04L 47/2441 |
| | | | 370/389 |
| 2012/0263388 A1* | 10/2012 | Vaddadi | G06F 16/583 |
| | | | 382/225 |
| 2018/0113888 A1* | 4/2018 | Peña Muñoz | G06F 16/56 |
| 2018/0113926 A1* | 4/2018 | Llaves | G06F 16/256 |
| 2021/0334633 A1 | 10/2021 | Hwang | |
| 2022/0035820 A1* | 2/2022 | Chen | G06F 16/248 |
| 2023/0238037 A1 | 7/2023 | Tseng et al. | |
| 2023/0384937 A1 | 11/2023 | Lee et al. | |
| 2024/0211146 A1* | 6/2024 | Sun | G06F 11/1048 |
| 2025/0265239 A1* | 8/2025 | Wang | G06F 16/2237 |

OTHER PUBLICATIONS

Efficient Clustering of High Dimensional Data Sets with Application to Reference Matching (Year: 2000).*

Y. -H. Lin et al., "NOR Flash-based Multilevel In-Memory-Searching Architecture for Approximate Computing," 2022 IEEE International Memory Workshop (IMW), 2022, doi: 10.1109/IMW52921.2022.9779250.

* cited by examiner

DATABASE CIRCUIT AND DATA MATCHING METHOD

BACKGROUND

Technical Field

The present disclosure relates to data storage and search technology. More particularly, the present disclosure relates to a database circuit and data matching method that stores feature data through multiple configurations and matches query data.

Description of Related Art

With the development of memory technology, three-dimensional (3D) memory has gradually replaced traditional planar memory due to its lower unit cost. In addition, since big data and artificial intelligence technology require a large amount of calculations, data searching and data searching functions have become important functions in 3D memory.

In order to reduce the time required for computing, today's 3D memory arrays usually perform various functions through in-memory computing (IMC). Therefore, how to effectively improve the accuracy of in-memory computing and reduce the complexity and consumption time of computing is one of the topics in this field.

SUMMARY

A database circuit is provided in the present disclosure. The database circuit comprises a plurality of data circuits and a processing circuit. The plurality of data circuits are configured to respectively store a plurality of feature data and receive a query data. The plurality of feature data form at least one feature data class. The processing circuit is coupled to the plurality of data circuits, and is configured to match the query data with the plurality of feature data to generate a plurality of matching signals and take a first reference value among a plurality of matching reference values as a target reference value to compare the plurality of matching signals with the target reference value. When at least one of the plurality of matching signals is greater than or equal to the target reference value, the processing circuit is configured to select one of the at least one feature data class as a matching result. When the plurality of matching signals are lower than the target reference value, the processing circuit is configured to take a second reference value among the plurality of matching reference values as the target reference value to compare the plurality of matching signals with the target reference value. The second reference value is lower than the first reference value.

In some embodiments of the database circuit, when the plurality of matching signals are lower than the plurality of matching reference values, the processing circuit is configured to determine that the plurality of feature data do not match the query data.

In some embodiments of the database circuit, each feature data class comprises at least one sub-feature class, each sub-feature class comprises at least one of the plurality of feature data, and each of the plurality of feature data comprises a plurality of bits. In each sub-feature class, the plurality of bits of the at least one of the plurality of feature data are at least partially different from a plurality of bits of a standard data.

In some embodiments of the database circuit, each of the plurality of bits of the standard data is of a bit value "0" or a bit value "1", and each of the plurality of bits of the plurality of feature data is of the bit value "0", the bit value "1" or a wildcard bit. At least one of the plurality of bits of the at least one feature data is different from the corresponding at least one of the plurality of bits of the standard data.

In some embodiments of the database circuit, each of the plurality of bits of the plurality of feature data and the standard data has a bit value. At least one of the plurality of bit values of the at least one feature data is different from the corresponding at least one of the plurality of bit values of the standard data.

In some embodiments of the database circuit, each of the plurality of bits of the standard data has a bit value. Each of the plurality of bits of the plurality of feature data has a bit value range, and each bit value of the standard data is within the bit value range of the corresponding one of the plurality of bits of the plurality of feature data.

In some embodiments of the database circuit, at least one of the plurality of bits of the at least one feature data is different from corresponding at least one of the plurality of bits of the standard data. The at least one of the plurality of bits of the at least one feature data is randomly configured or configured by design.

In some embodiments of the database circuit, the standard data is stored in the at least one feature data class, and the processing circuit is further configured to match the query data with the standard data to generate the plurality of matching signals.

In some embodiments of the database circuit, each of the plurality of feature data has a similarity value to indicate the degree of similarity between the plurality of feature data and the standard data. When the at least one of the plurality of matching signals is greater than or equal to the target reference value, the processing circuit is configured to select the feature data class corresponding to one of the at least one feature data corresponding to the at least one matching signal that has a biggest similarity value as the matching result.

In some embodiments of the database circuit, when at least one of the plurality of matching signals is greater than or equal to the target reference value, the processing circuit is configured to select the feature data class that comprises the largest number of the at least one feature data corresponding to the at least one of the plurality of matching signals as the matching result.

A data matching method suitable for a database circuit comprising a plurality of data circuits and a processing circuit is provided in the present disclosure. The data matching method comprises: storing, by the plurality of data circuits, a plurality of feature data, wherein the plurality of feature data form at least one feature data class; receiving, by the plurality of data circuits, a query data; matching, by the processing circuit, the query data with the plurality of feature data, to generate a plurality of matching signals; taking, by the processing circuit, a first reference value among a plurality of matching reference values as a target reference value, to compare the plurality of matching signals with the target reference value; in response to at least one of the plurality of matching signals being greater than or equal to the target reference value, selecting, by the processing circuit, one of the at least one feature data class as a matching result; and in response to the plurality of matching signals being lower than the target reference value, taking, by the processing circuit, a second reference value among the plurality of matching reference values as the target reference value, to compare the plurality of matching signals with the target reference value. The second reference value is lower than the first reference value.

In some embodiments of the data matching method, the data matching method further comprises: in response to the plurality of matching signals being lower than the plurality of matching reference values, determining, by the processing circuit, that the plurality of feature data do not match the query data.

In some embodiments of the data matching method, storing, by the plurality of data circuits, the plurality of feature data comprises: classifying, by the plurality of data circuits, at least one sub-feature class in each feature data class. Each sub-feature class comprises at least one of the plurality of feature data, and each of the plurality of feature data comprises a plurality of bits. In each sub-feature class, the plurality of bits of the at least one of the plurality of feature data are at least partially different from a plurality of bits of a standard data.

In some embodiments of the data matching method, each of the plurality of bits of the standard data is of a bit value "0" or a bit value "1", and each of the plurality of bits of the plurality of feature data is of the bit value "0", the bit value "1" or a wildcard bit. At least one of the plurality of bits of the at least one feature data is different from the corresponding at least one of the plurality of bits of the standard data.

In some embodiments of the data matching method, each of the plurality of bits of the plurality of feature data and the standard data has a bit value. At least one of the plurality of bit values of the at least one feature data is different from the corresponding at least one of the plurality of bit values of the standard data.

In some embodiments of the data matching method, each of the plurality of bits of the standard data has a bit value. Each of the plurality of bits of the plurality of feature data has a bit value range, and each bit value of the standard data is within the bit value range of the corresponding one of the plurality of bits of the plurality of feature data.

In some embodiments of the data matching method, storing, by the plurality of data circuits, the plurality of feature data further comprises: configuring, by the plurality of data circuits, at least random one of the plurality of bits of the at least one feature data to be different from corresponding at least one of the plurality of bits of the standard data; or configuring, by the plurality of data circuits, at least designed one of the plurality of bits of the at least one feature data to be different from corresponding at least one of the plurality of bits of the standard data.

In some embodiments of the data matching method, the data matching method further comprises: storing, by the plurality of data circuits, the standard data, in the at least one feature data class; and matching, by the processing circuit, the query data with the standard data, to generate the plurality of matching signals.

In some embodiments of the data matching method, each of the plurality of feature data has a similarity value to indicate the degree of similarity between the plurality of feature data and the standard data, and selecting, by the processing circuit, the one of the at least one feature data class as the matching result comprises: selecting, by the processing circuit, the feature data class corresponding to one of the at least one feature data corresponding to the at least one matching signal that has a biggest similarity value, as the matching result.

In some embodiments of the data matching method, selecting, by the processing circuit, the one of the at least one feature data class as the matching result comprises: selecting, by the processing circuit, the feature data class that comprises the largest number of the at least one feature data corresponding to the at least one of the plurality of matching signals, as the matching result.

With the database circuit and data matching method in the present disclosure, the feature data can be stored and searched in various configurations, thereby effectively improving the accuracy of in-memory computing and reducing the complexity and consumption time of computing.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings.

In the present disclosure, when an element is referred to as "connected", it may mean "electrically connected" or "optical connected". When an element is referred to as "coupled", it may mean "electrically coupled" or "optical coupled". "Connected" or "coupled" can also be used to indicate that two or more components operate or interact with each other. As used in the present disclosure, the singular forms "a", "one" and "the" are also intended to include plural forms, unless the context clearly indicates otherwise. It will be further understood that when used in this specification, the terms "comprises (comprising)" and/ or "includes (including)" designate the existence of stated features, steps, operations, elements and/or components, but the existence or addition of one or more other features, steps, operations, elements, components, and/or groups thereof are not excluded.

Figure 1:
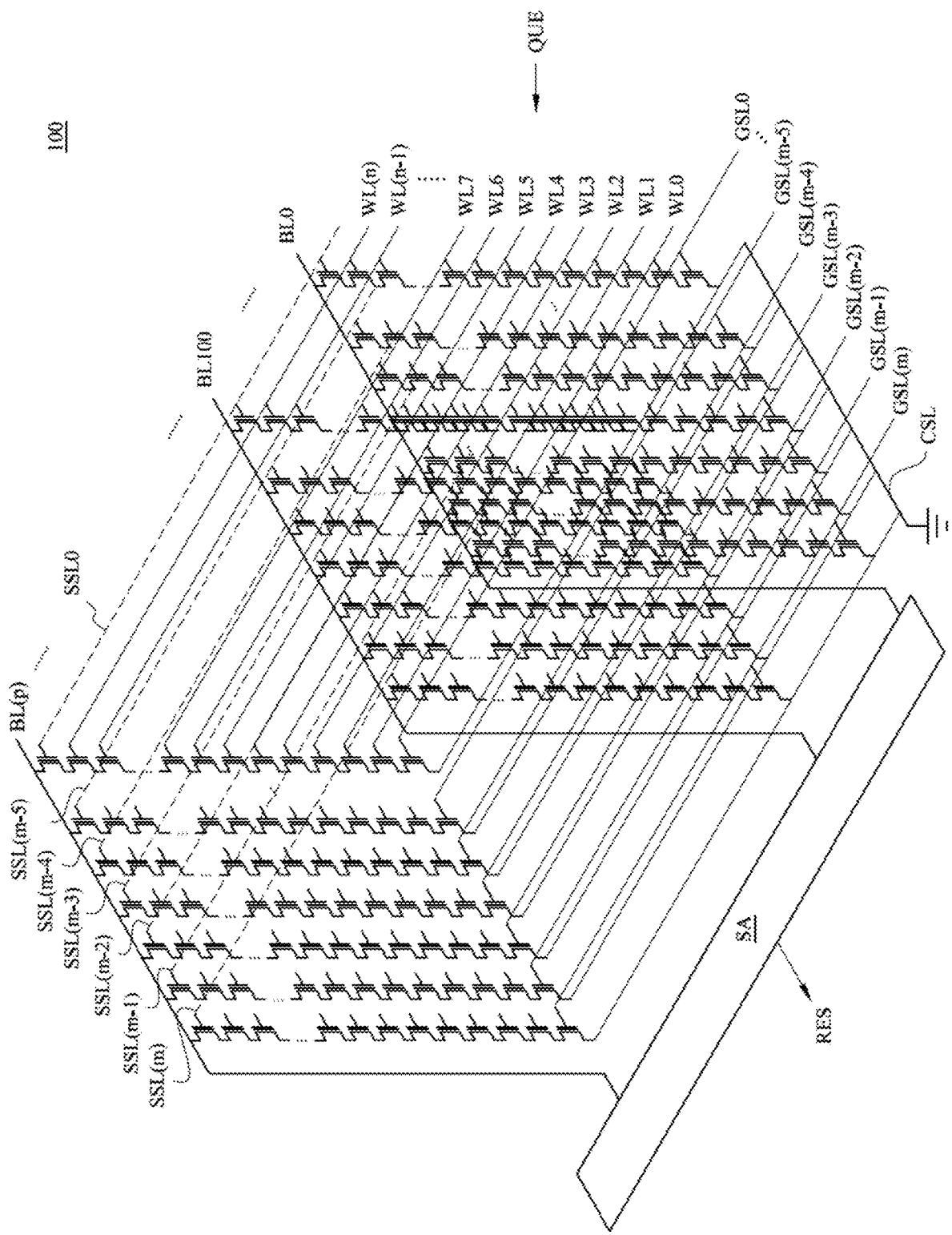
FIG. 1 is a schematic diagram of a database circuit in accordance with some embodiments of the present disclosure.

FIG. 1 is a schematic diagram of a database circuit 100 in accordance with some embodiments of the present disclosure. In some embodiments, the database circuit 100 comprises a plurality of data circuits (not labeled for the brevity of the figure and will be described in subsequent paragraphs and figures), a processing circuit SA, parallel-arranged bit lines BL0-BL(p), word lines WL0-WL(n), string select lines SSL0-SSL(m) and ground select lines GSL0-GSL(m), wherein m, n, p are positive integers.

The data circuits are coupled to the processing circuit SA, formed by a plurality of memory units, and configured to store a plurality of feature data (which will be described in subsequent paragraphs and figures) and receive a query data QUE. In addition, each of the data circuits is connected between one of the bit lines BL0-BL(p) and the common source line CSL, and is connected to the word lines WL0-WL(n), one of the string select lines SSL0-SSL(m) and one of the ground select lines GSL0-GSL(m).

The processing circuit SA is coupled to the plurality of data circuits and the bit lines BL0-BL(p) and is configured to match the feature data stored in each of the data circuits based on the query data QUE. When the processing circuit SA determines that the query data QUE matches at least one feature data, the processing circuit SA will generate a matching result RES. In some embodiments, the processing circuit SA can be implemented with a suitable sense amplifier. The detailed method of matching the query data QUE with the feature data by the processing circuit SA will be described in subsequent paragraphs.

Figure 2:
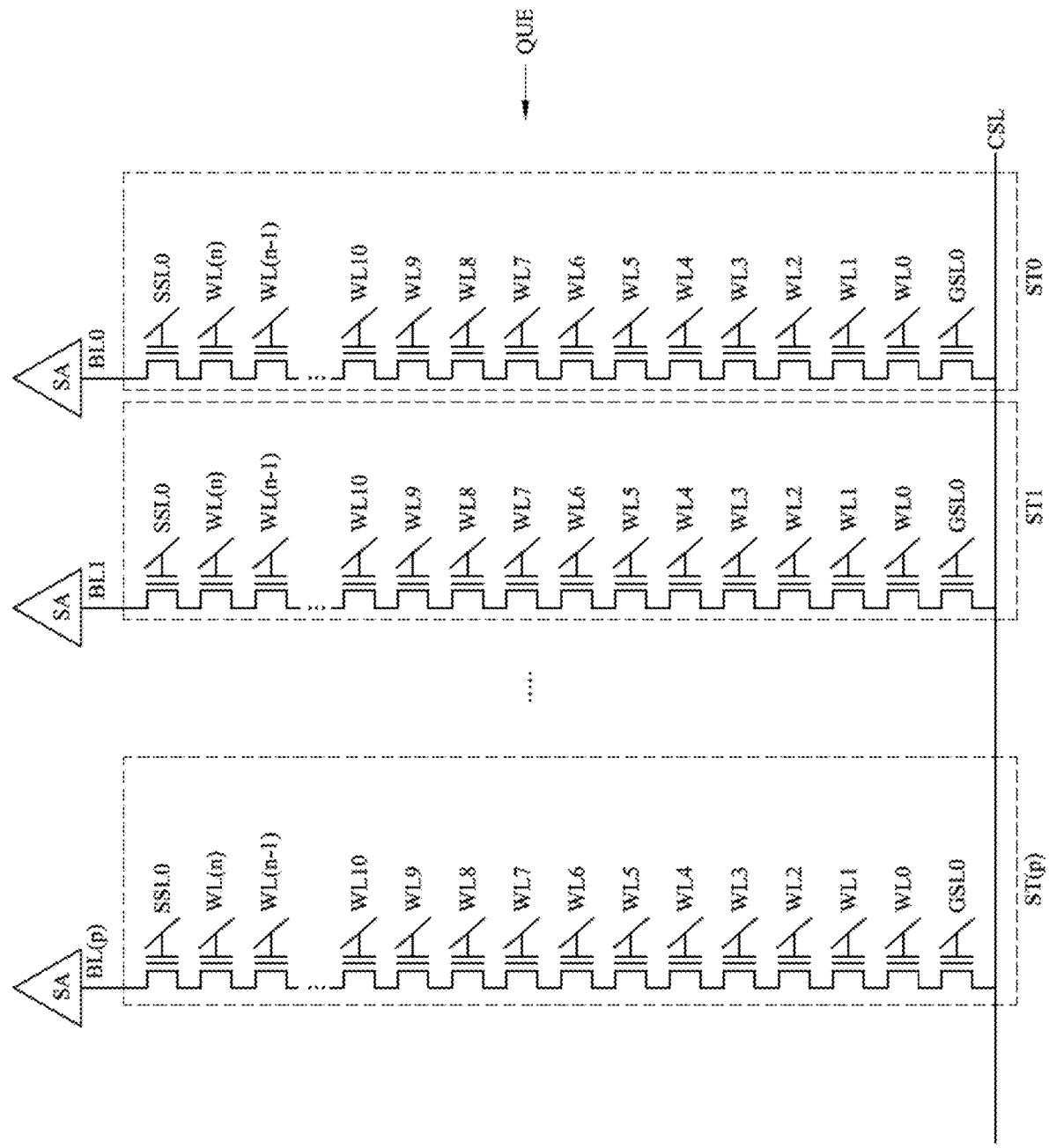
FIG. 2 is a schematic diagram of data circuits in accordance with some embodiments of the present disclosure.

The structure of the data circuits is shown in FIG. 2. FIG. 2 is a schematic diagram of data circuits ST0-ST(p) in accordance with some embodiments of the present disclosure. In some embodiments, the data circuits ST0-ST(p) are respectively coupled between the bit lines BL0-BL(p) and the common source line CSL. In some embodiments, each of the data circuits ST0-ST(p) comprises a plurality of serially coupled transistors with the same number, and the control terminals of these transistors are respectively coupled to the string select lines SSL0-SSL(m), ground select lines GSL0-GSL(m) or word lines WL0-WL(n).

Take the instance in FIG. 2 as an example, in the data circuit ST0, the control terminal of the transistor closest to the common source line CSL is coupled to the ground select line GSL0, the control terminal of the transistor closest to the bit line BL0 is coupled to the string select line SSL0, and the control terminals of the other transistors are respectively coupled to the word lines WL0-WL(n).

The configuration of each of the bit lines BL1-BL(p) and the corresponding plurality of data circuits is similar to the configuration of the bit line BL0 and the data circuit ST0. For example, the bit line BL1 is connected to the data circuit ST1, and the connection relationship of the data circuit ST1, the common source line CSL, the string select lines SSL0-SSL(m), the ground select lines GSL0-GSL(m) and the word lines WL0-WL(n) is similar to the aforementioned content about the data circuit ST0. For the sake of brevity, similar content will not be repeated here.

Through the connection relationships between the plurality of bit lines, the plurality of data circuits, the plurality of word lines, the plurality of string select lines and the plurality of ground select lines mentioned above, the database circuit 100 forms a three-dimensional (3D) structure as shown in FIG. 1.

In some embodiments, according to the configuration and conduction status of the plurality of transistors in the data circuit, a feature data comprising a plurality of bits is stored in each data circuit. In each of the data circuits, two adjacent transistors coupled to the word lines correspond to one bit of the feature data. Take the instance in FIG. 2 as an example, in the data circuit ST0, the conduction status of the transistors coupled to the word line WL0 and the word line WL1 corresponds to the first bit of the feature data stored in the data circuit ST0. The conduction status of the transistors coupled to the word line WL2 and the word line WL3 corresponds to the second bit of the feature data stored in the data circuit ST0, and so on.

Therefore, according to the conduction status of each transistor in the data circuit, the data circuits ST0-ST(p) can store various feature data, and these feature data can be classified in various ways. FIGS. 3A-3D are schematic diagrams of the classifications of the feature data F11-F13, F21-F23, F31-F33 and F41-F43 in accordance with various embodiments of the present disclosure.

In some embodiments, the feature data F11-F13, F21-F23, F31-F33 and F41-F43 can be stored by the data circuits in FIG. 1 (not labeled) and the data circuits ST0-ST(p) in FIG. 2. For example, the data circuit ST0 is configured to store the feature data F11, and the data circuit ST1 is configured to store the feature data F12.

In some embodiments, all feature data can form at least one feature data class, each feature data class comprises a sub-feature class, and the sub-feature class comprises one standard data and at least one partially standard data. Take the embodiment in FIG. 3A as an example, the feature data F11-F13, F21-F23, F31-F33 and F41-F43 form feature data classes CLS_A, CLS_B, CLS_C and CLS_D. The feature data class CLS_A comprises a sub-feature class, which comprises the feature data F11 as the standard data and the feature data F12 and F13 as the partially standard data; the feature data class CLS_B comprises a sub-feature class, which comprises the feature data F21 as the standard data and the feature data F22 and F23 as the partially standard data; the feature data class CLS_C comprises a sub-feature class, which comprises the feature data F31 as the standard data and the feature data F32 and F33 as the partially standard data; the feature data class CLS_D comprises a sub-feature class, which comprises the feature data F41 as the standard data and the feature data F42 and F43 as the partially standard data.

As mentioned above, each of the feature data F11-F13, F21-F23, F31-F33 and F41-F43 comprises a plurality of bits. In some embodiments, in each of the sub-feature classes, the bits of the partially standard data are partially different from the bits of the standard data. In the present disclosure, the term "similarity value" refers to the degree of similarity between the bits of the feature data and the bits of the standard data.

For the sake of clarity, the similarity values of the bits of the partially standard data and the bits of the standard data are shown in FIGS. 3A-3D. For example, in FIG. 3A, 90% of the bits of the feature data F12 (i.e., partially standard data) are the same as the corresponding bits of the feature data F11 (i.e., standard data), and 80% of the bits of the feature data F13 are the same as the corresponding bits of the feature data F11.

Figure 3A:
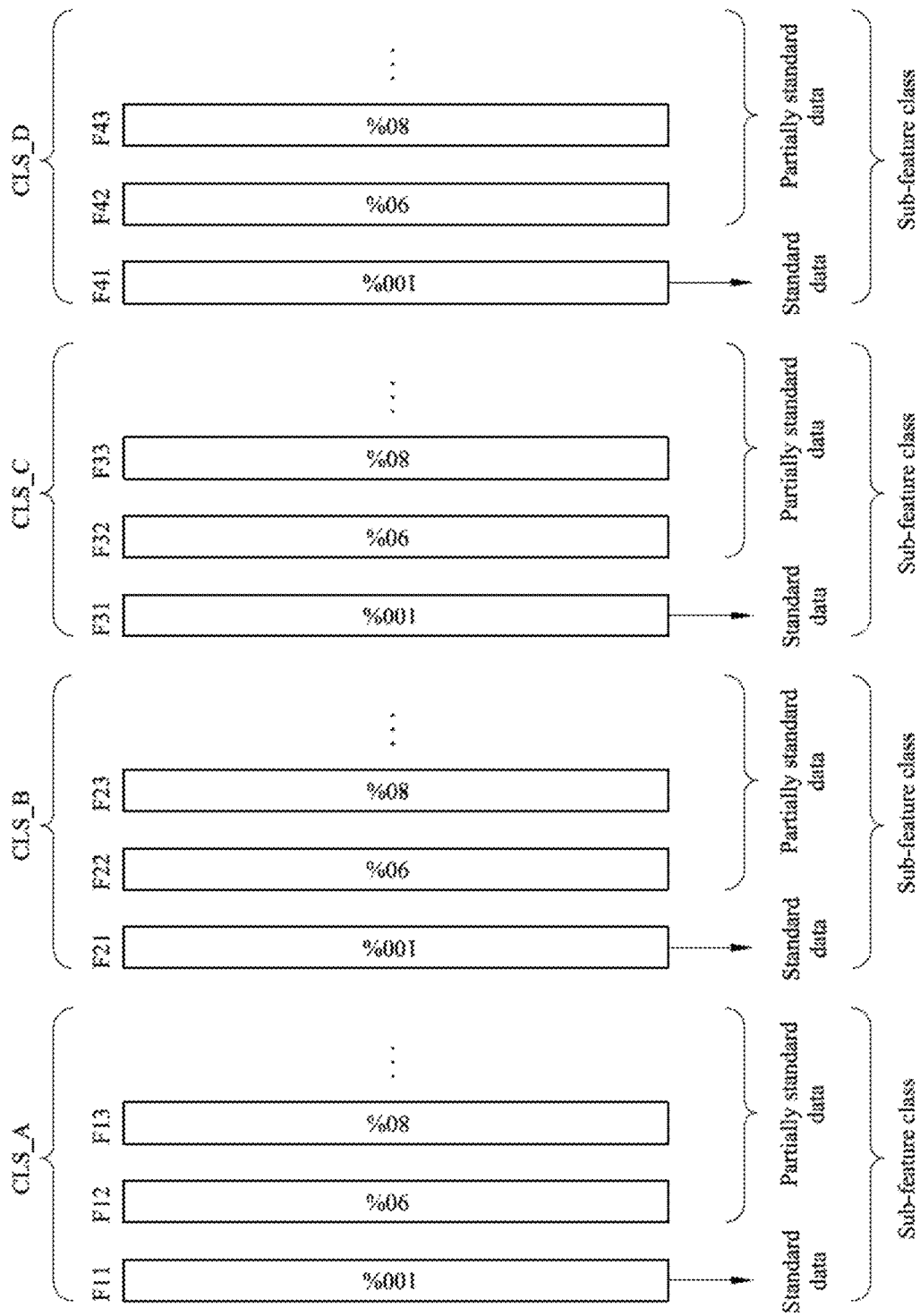
FIG. 3A is a schematic diagram of the classification of feature data in accordance with some embodiments of the present disclosure.

Through the classification of the feature data of the embodiment in FIG. 3A, the database circuit 100 can store various types of feature data. For example, the feature data classes CLS_A, CLS_B, CLS_C and CLS_D can respectively represent person A, person B, person C and person D. The sub-feature class represents the classification of eyes, and the feature data F11-F13, F21-F23, F31-F33 and F41-F43 each represent different image data of eyes. Therefore, the database circuit 100 can determine that the query data QUE corresponds to person A, person B, person C, person D or nobody based on the eye image data, according to the query data QUE and the feature data F11-F13, F21-F23, F31-F33 and F41-F43.

Figure 3B:
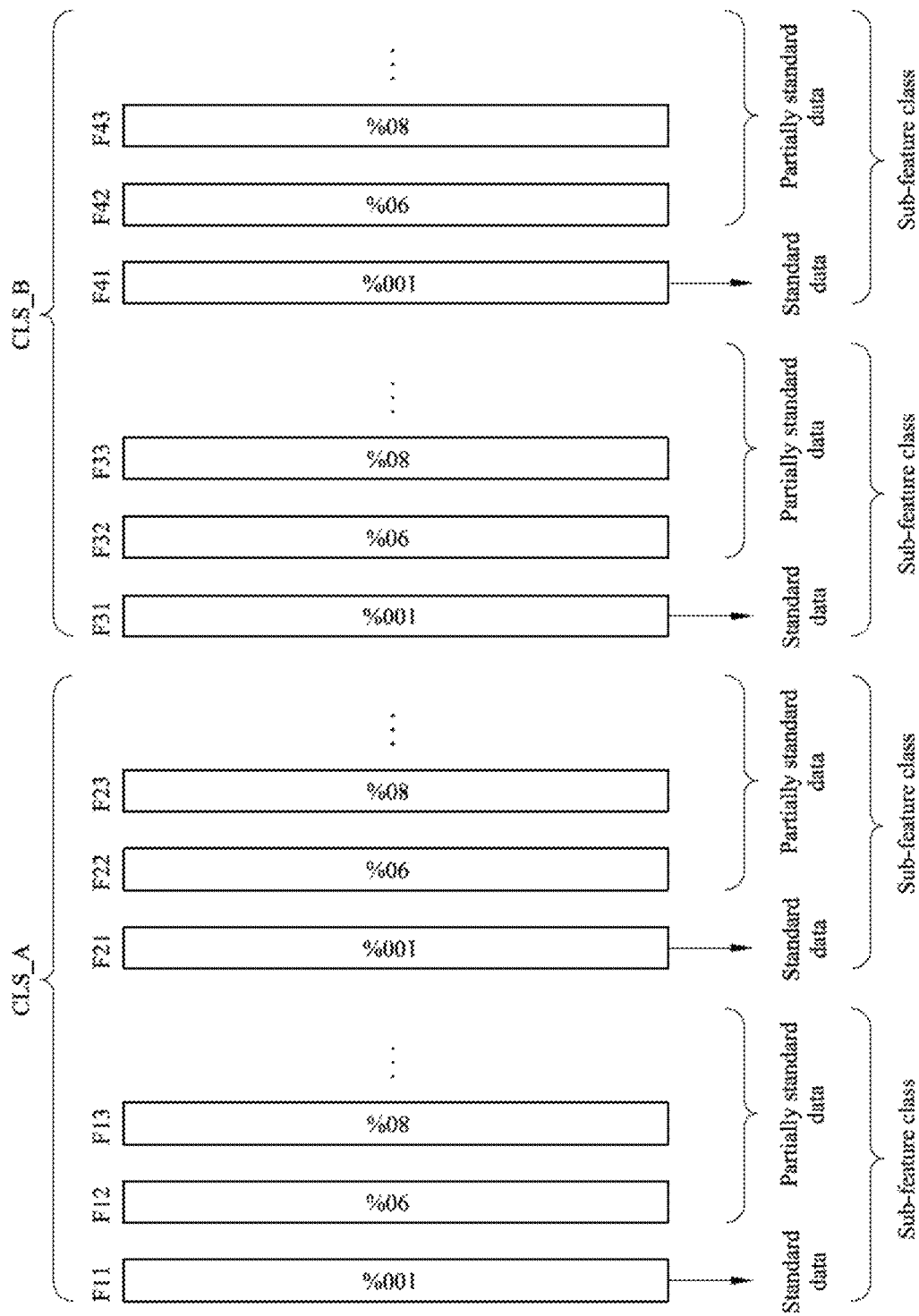
FIG. 3B is a schematic diagram of the classification of feature data in accordance with some embodiments of the present disclosure.

The embodiment of FIG. 3B is similar to which in FIG. 3A. The difference is that in the embodiment of FIG. 3B, each of the feature data classes can comprise more than one sub-feature class. Continuing from the abovementioned example, the feature data classes CLS_A and CLS_B can respectively represent person A and person B. The two sub-feature classes respectively represent the classifications of eyes and nose. The feature data F11-F13 and F31-F33 each represent different image data of eyes, and the feature data F21-F23 and F41-F43 each represent different image data of nose. Therefore, the database circuit 100 can determine that the query data QUE corresponds to person A, person B or nobody based on the eye image data and the nose image data, according to the query data QUE and the feature data F11-F13, F21-F23, F31-F33 and F41-F43.

Figure 3C:
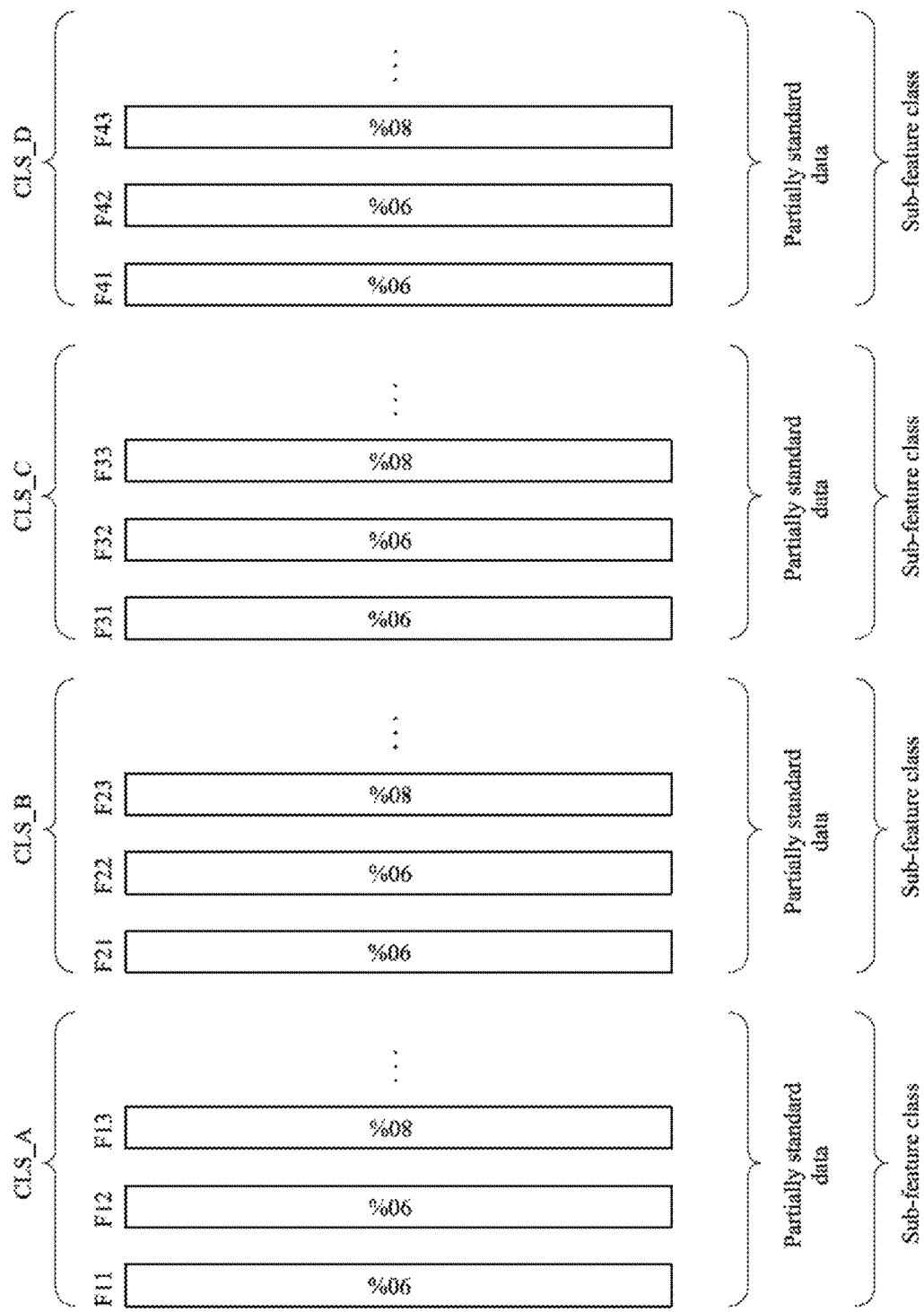
FIG. 3C is a schematic diagram of the classification of feature data in accordance with some embodiments of the present disclosure.
Figure 3D:
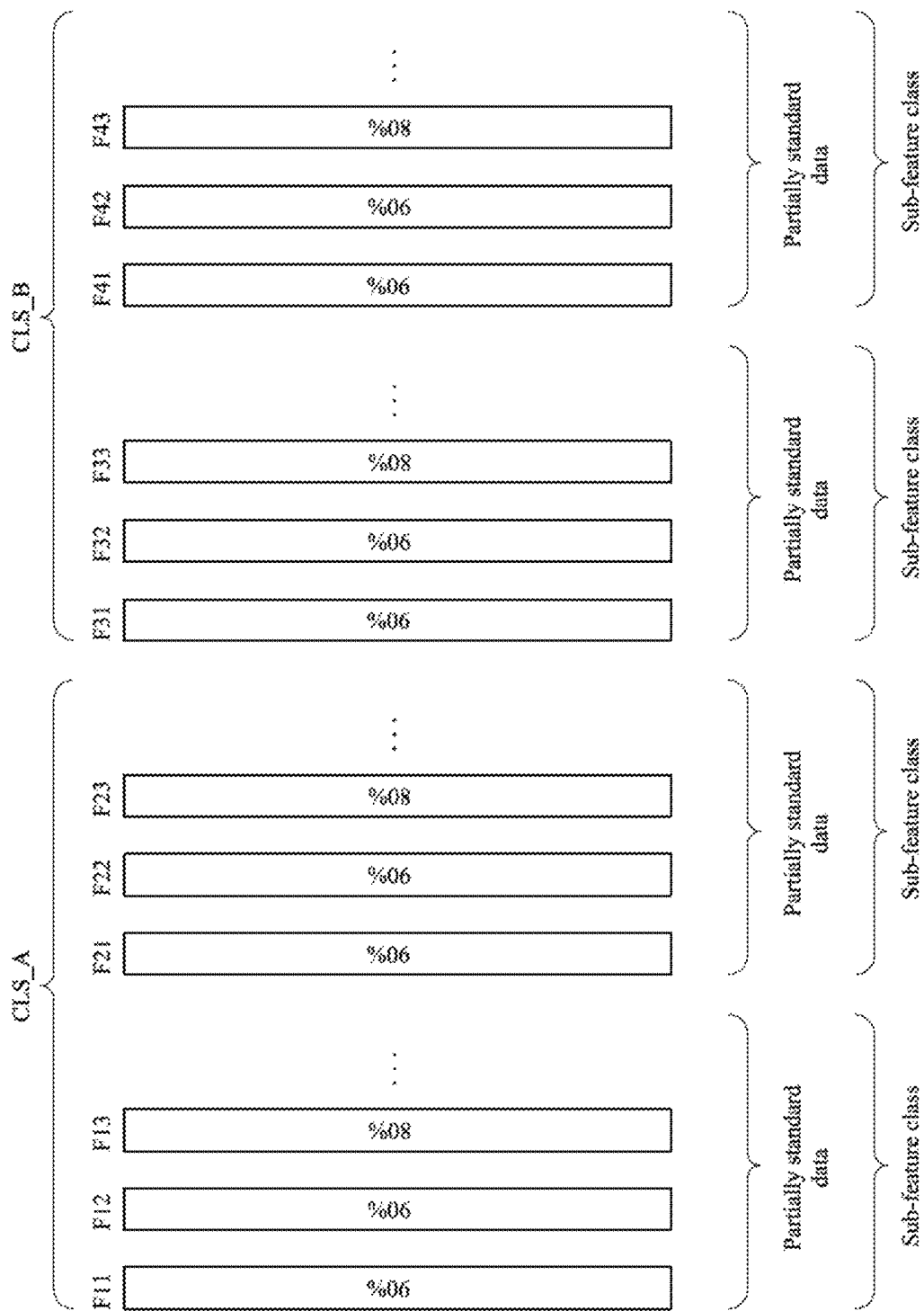
FIG. 3D is a schematic diagram of the classification of feature data in accordance with some embodiments of the present disclosure.

The embodiments of FIG. 3C and FIG. 3D are similar to FIG. 3A and FIG. 3B respectively. The difference is that in the embodiments of FIG. 3C and FIG. 3D, the feature data F11-F13, F21-F23, F31-F33, and F41-F43 are all partially standard data (i.e., there is no standard data). In some embodiments not shown, some of the sub-feature classes comprise the standard data and the partially standard data, while the other of the sub-feature classes may only comprise partially standard data.

It should be noted that the number and classification of the feature data in FIGS. 3A-3D are only examples, and are not intended to limit the present disclosure. Other numbers and other classifications of the feature data are within the scope of the present disclosure. In some embodiments, the database circuit 100 can store more than 12 feature data as shown in FIGS. 3A-3D, and these feature data can be classified into more than 4 feature data classes as shown in FIG. 3A.

Figure 4A:
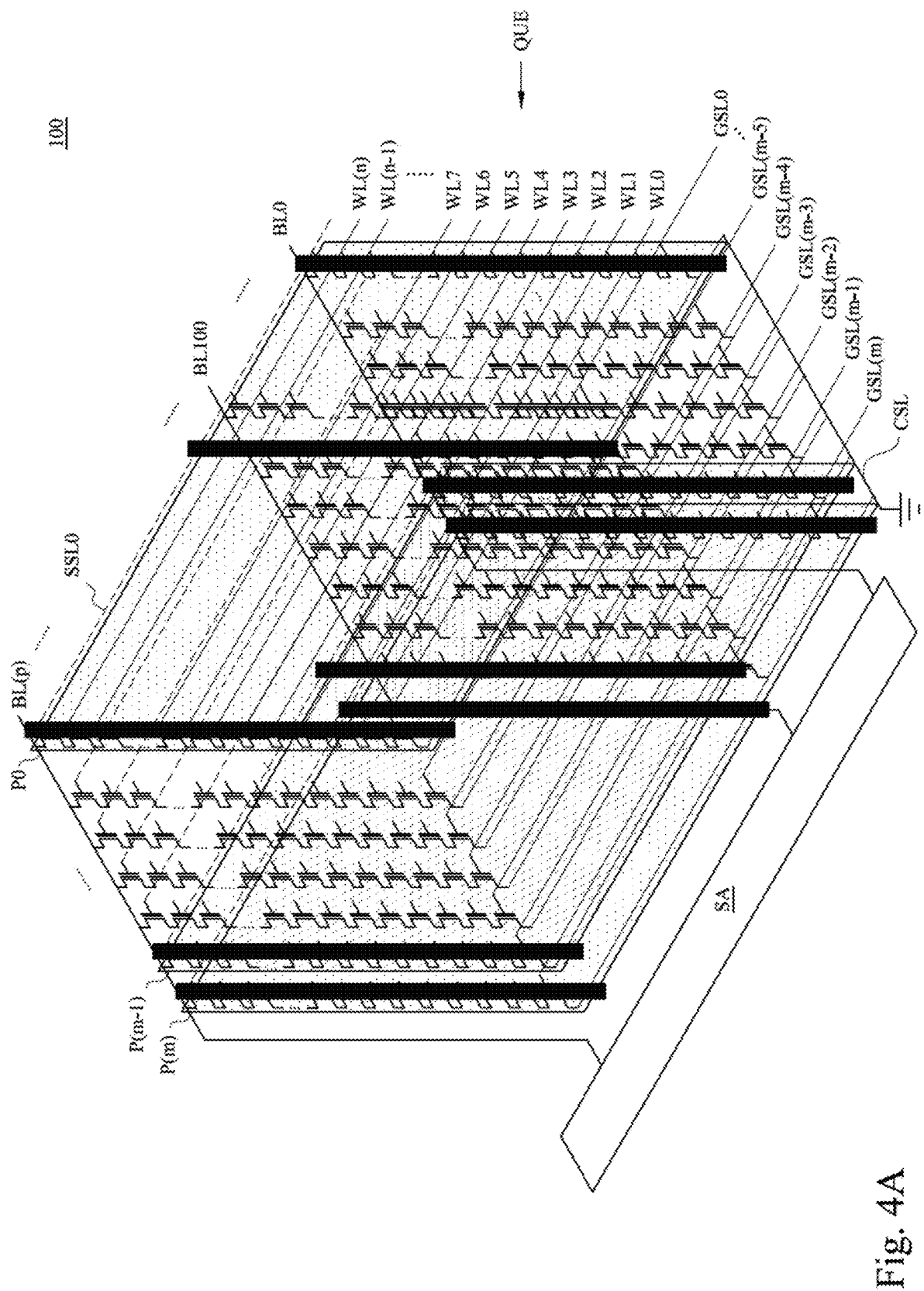
FIG. 4A is a schematic diagram of the database circuit and data planes in accordance with some embodiments of the present disclosure.

Therefore, the database circuit 100 can classify a plurality of feature data and store them in a plurality of data circuits. FIG. 4A is a schematic diagram of the database circuit 100 and data planes P0-P(m) in accordance with some embodiments of the present disclosure. In some embodiments, the data circuits in the database circuit 100 can be classified into data planes P0-P(m), and the feature data stored in the data circuits can be configured in the data planes P0-P(m) in various ways.

Please refer to FIGS. 4B-4E. FIGS. 4B-4E are schematic diagrams of the configurations of the feature data on the data planes P0-P(m) in accordance with various embodiments of the present disclosure.

Figures 4B, 4C:
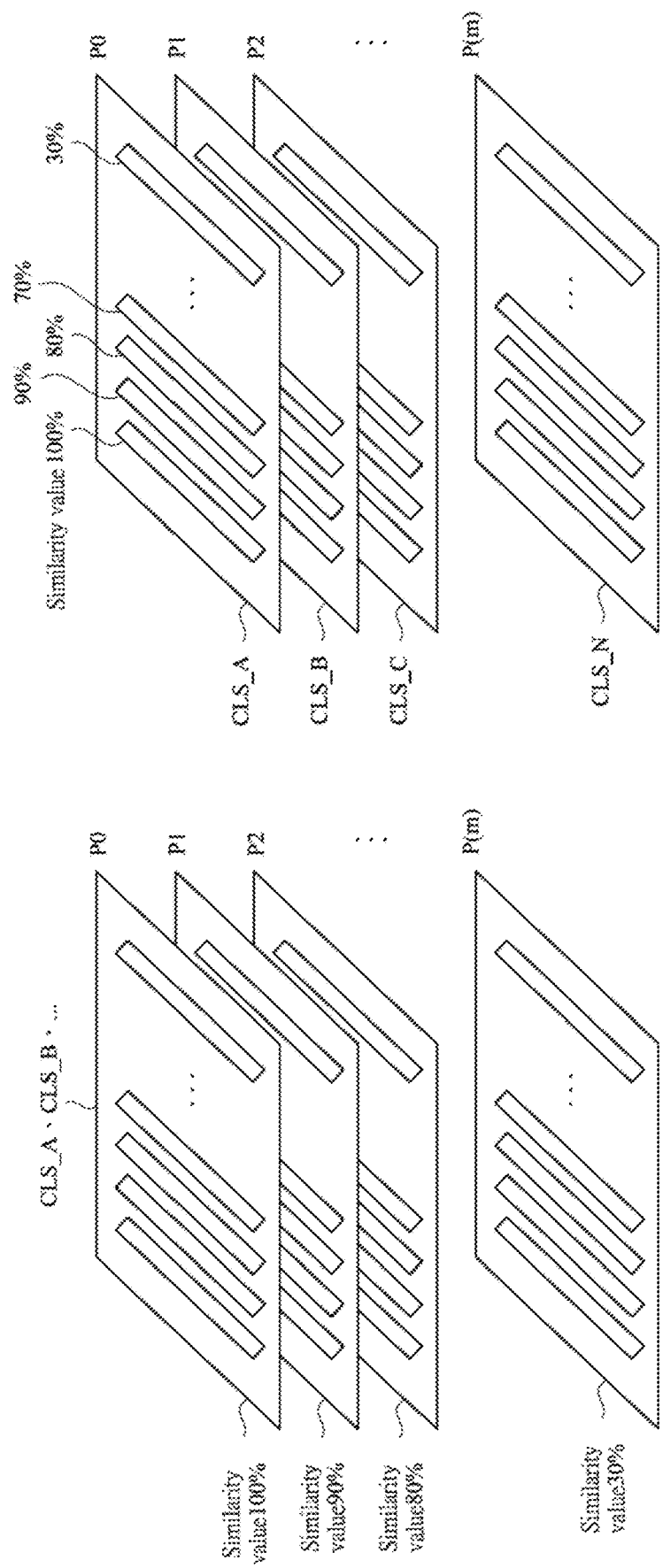
FIG. 4B is a schematic diagram of the configuration of feature data on data planes in accordance with some embodiments of the present disclosure.
FIG. 4C is a schematic diagram of the configuration of feature data on data planes in accordance with some embodiments of the present disclosure.

In the embodiment of FIG. 4B, each of the data planes is configured to store the feature data with the same similarity value in all feature data classes. As shown in FIG. 4B, the data plane P0 is configured to store the feature data with a similarity value of 100% (i.e., standard data) of the feature data classes CLS_A-CLS_N; the data plane P1 is configured to store the feature data with a similarity value of 90% of the feature data classes CLS_A-CLS_N; the data plane P2 is configured to store the feature data with a similarity value of 80% of the feature data classes CLS_A-CLS_N, and so on.

In the embodiment of FIG. 4C, each of the data planes is configured to store the feature data of one feature data class. As shown in FIG. 4C, the data plane P0 is configured to store the feature data of the feature data class CLS_A; the data plane P1 is configured to store the feature data of the feature data class CLS_B; the data plane P2 is configured to store the feature data of the feature data class CLS_C, and so on.

Figure 4D:
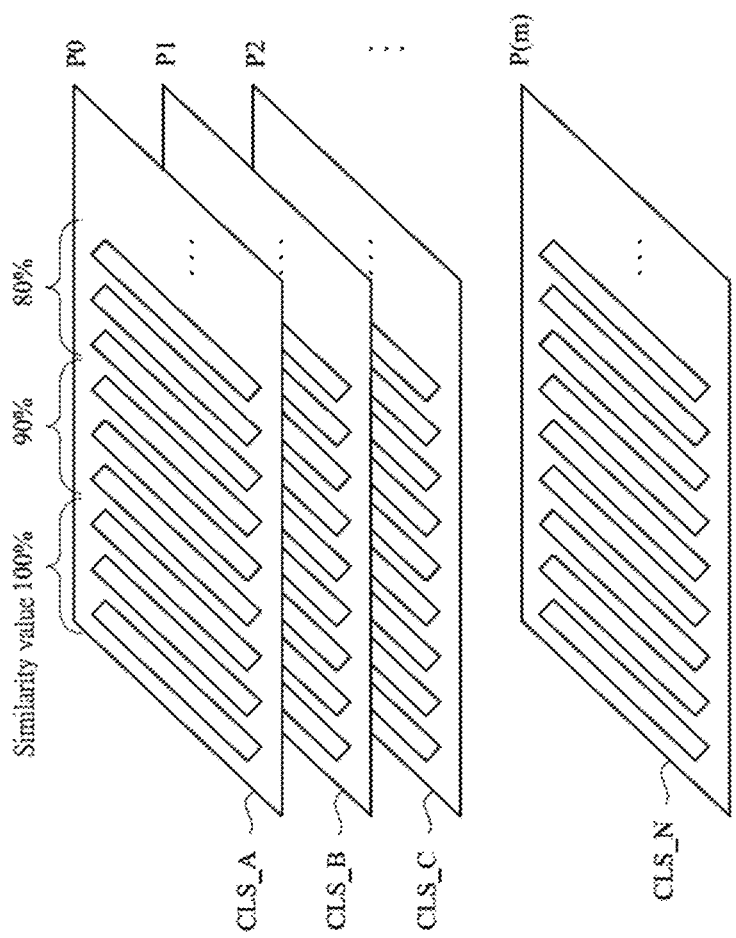
FIG. 4D is a schematic diagram of the configuration of feature data on data planes in accordance with some embodiments of the present disclosure.

In the embodiment of FIG. 4D, each of the data planes is configured to store the feature data of one feature data class, and the feature data class comprises a plurality of sub-feature classes. As shown in FIG. 4D, the data plane P0 is configured to store the feature data of a plurality of sub-feature classes of the feature data class CLS_A; the data plane P1 is configured to store the feature data of a plurality of sub-feature classes of the feature data class CLS_B; the data plane P2 is configured to store the feature data of a plurality of sub-feature classes of the feature data class CLS_C, and so on.

Figure 4E:
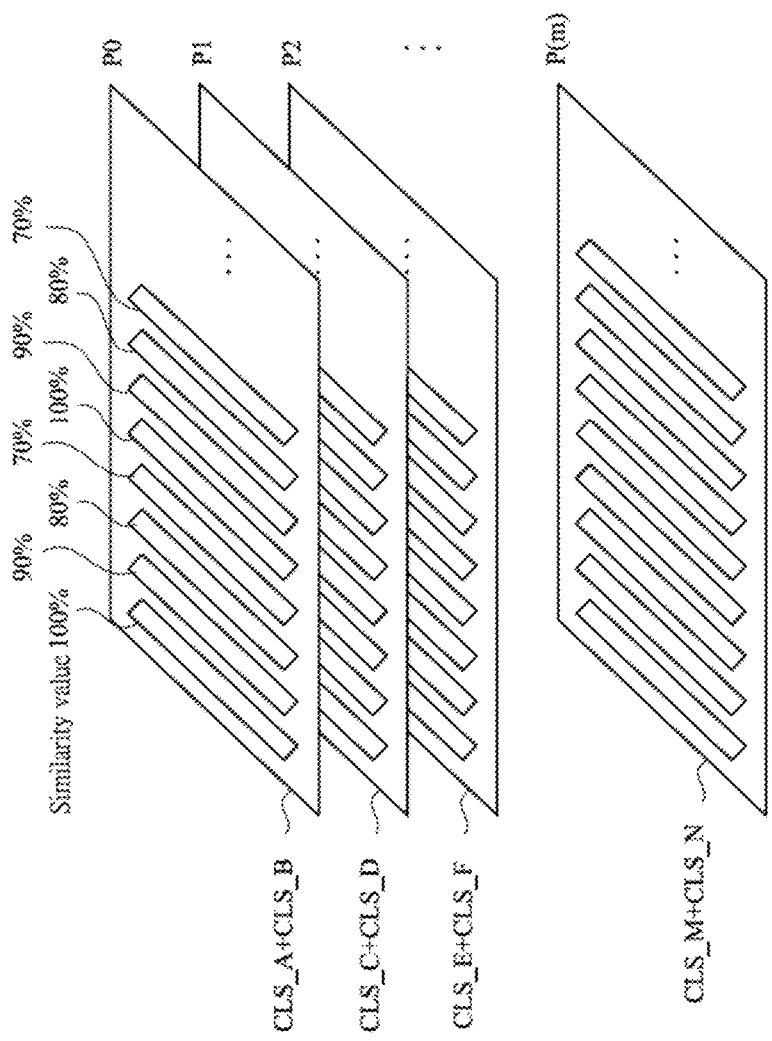
FIG. 4E is a schematic diagram of the configuration of feature data on data planes in accordance with some embodiments of the present disclosure.

In the embodiment of FIG. 4E, each of the data plane is configured to store the feature data of more than one feature data class. As shown in FIG. 4E, the data plane P0 is configured to store the feature data of the feature data classes CLS_A and CLS_B; the data plane P1 is configured to store the feature data of the feature data classes CLS_C and CLS_D; the data plane P2 is configured to store the feature data of the feature data classes CLS_E and CLS_F, and so on.

Figure 5A:
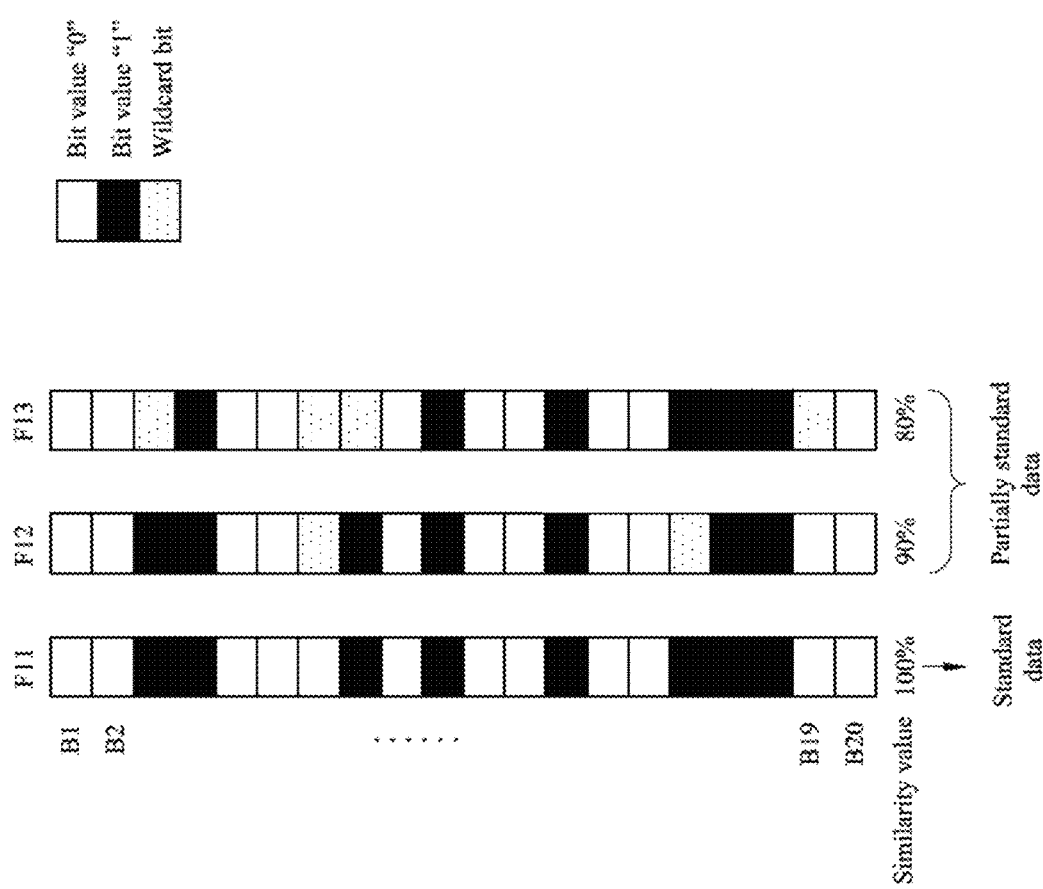
FIG. 5A is a schematic diagram of the bits of feature data in accordance with some embodiments of the present disclosure.

FIG. 5A is a schematic diagram of bits B1-B20 of the feature data F11-F13 in accordance with some embodiments of the present disclosure. In the embodiment of FIG. 5A, according to the configuration and conduction status of the plurality of transistors in the data circuit, the bits B1-B20 of the feature data F11 belonging to the standard data are each of a bit value "0" or a bit value "1", and the bits B1-B20 of the feature data F12 and F13 belonging to the partially standard data are each of the bit value "0", the bit value "1" or a wildcard bit, wherein the transistors corresponding to the wildcard bit will always be matched when receiving input data of the bit value "0" or the bit value "1".

Based on the number of differences between the bits B1-B20 of the feature data F12 and F13 and the bits B1-B20 of the feature data F11 (i.e., the standard data), the similarity values of the feature data F12 and F13 can be determined. Take the instance in FIG. 5A as an example, the feature data F12 has 2 bits that are different from the feature data F11 (i.e., the other 18 bits are same as the feature data F11), so the similarity value of the feature data F12 is 90%; the feature data F13 has 4 bits that are different from the feature data F11 (i.e., the other 16 bits are same as the feature data F11), so the similarity value of the feature data F13 is 80%.

It should be noted that the number of the bits of the feature data in FIG. 5A is only an example, and is not intended to limit the present disclosure. Other numbers of the bits of the feature data are within the scope of the present disclosure.

Figure 5B:
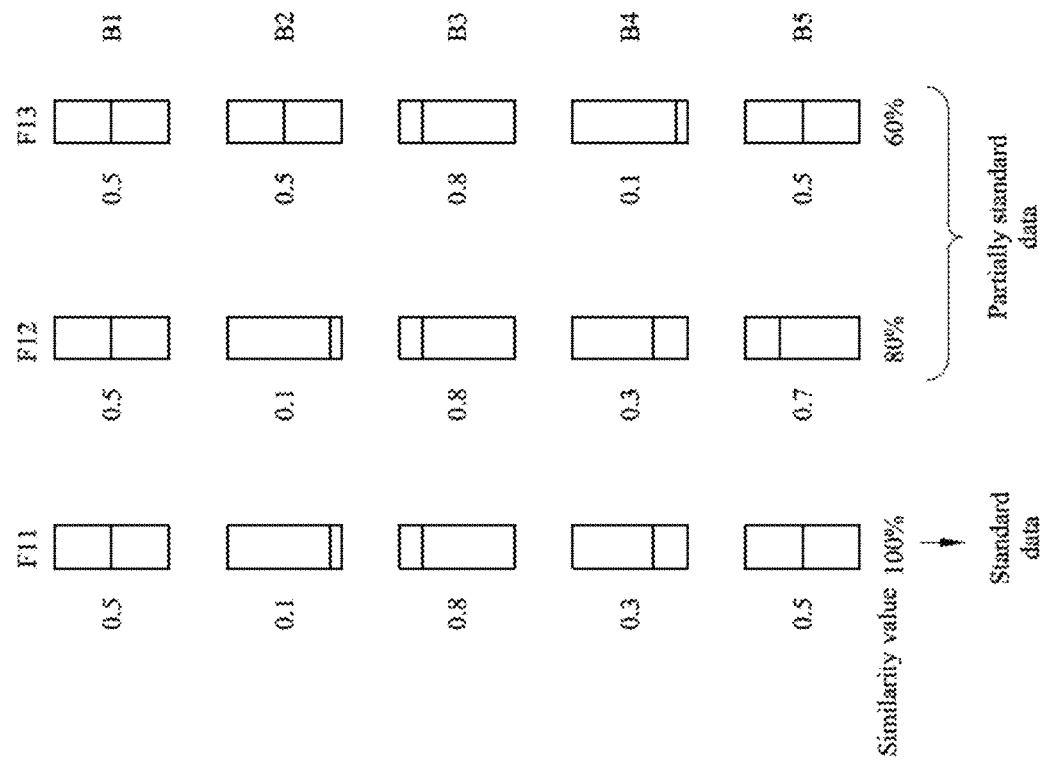
FIG. 5B is a schematic diagram of the bits of feature data in accordance with some embodiments of the present disclosure.

FIG. 5B is a schematic diagram of bits B1-B5 of the feature data F11-F13 in accordance with some embodiments of the present disclosure. In some embodiments, each of the bits B1-B5 of the feature data F11-F13 has a bit value between 0 and 1. Take the instance in FIG. 5B as an example, the bits B1-B5 of the feature data F11 have bit values of 0.5, 0.1, 0.8, 0.3 and 0.5 respectively.

Based on the number of differences between the bits B1-B5 of the feature data F12 and F13 and the bits B1-B5 of the feature data F11 (i.e., the standard data), the similarity values of the feature data F12 and F13 can be determined. Take the instance in FIG. 5B as an example, the bit value of the bit B5 of the feature data F12 is different from the bit value of the bit B5 of the feature data F11, so the similarity value of the feature data F12 is 80%; the bit values of the bits B2 and B4 of the feature data F13 are different from the bit values of the bits B2 and B4 of the feature data F11, so the similarity value of the feature data F13 is 60%.

In some embodiments, the same bit value between the bits of the partially standard data and the standard data is the bit value with the highest occurrence rate of the bit, and the different bit value between the bits of the partially standard data and the standard data is the bit value with the second highest occurrence rate of the bit. Take the instance in FIG. 5B as an example, for the bit B1, the bit value with the highest occurrence rate is 0.5. Since the bit B1 of the feature data F12 and F13 are same as the bit B1 of the feature data F11, the bit values of the bit B1 of the feature data F12 and F13 will be set to 0.5. On the other hand, for the bit B2, the bit value with the highest occurrence rate is 0.1, and the bit value with the second highest occurrence rate is 0.5. Since the bit B2 of the feature data F12 is same as the bit B2 of the feature data F11, and the bit B2 of the feature data F13 is different from the bit B2 of the feature data F11, the bit value of the bit B2 of the feature data F12 will be set to 0.1, and the bit value of the bit B2 of the feature data F13 will be set to 0.5.

In some embodiments, the different bits between the partially standard data (e.g., the feature data F12 and F13) and the standard data (e.g., the feature data F11) can be configured randomly, be configured through the training of a model (e.g., a neural network model), or be configured by design (i.e., artificially).

Figure 5C:
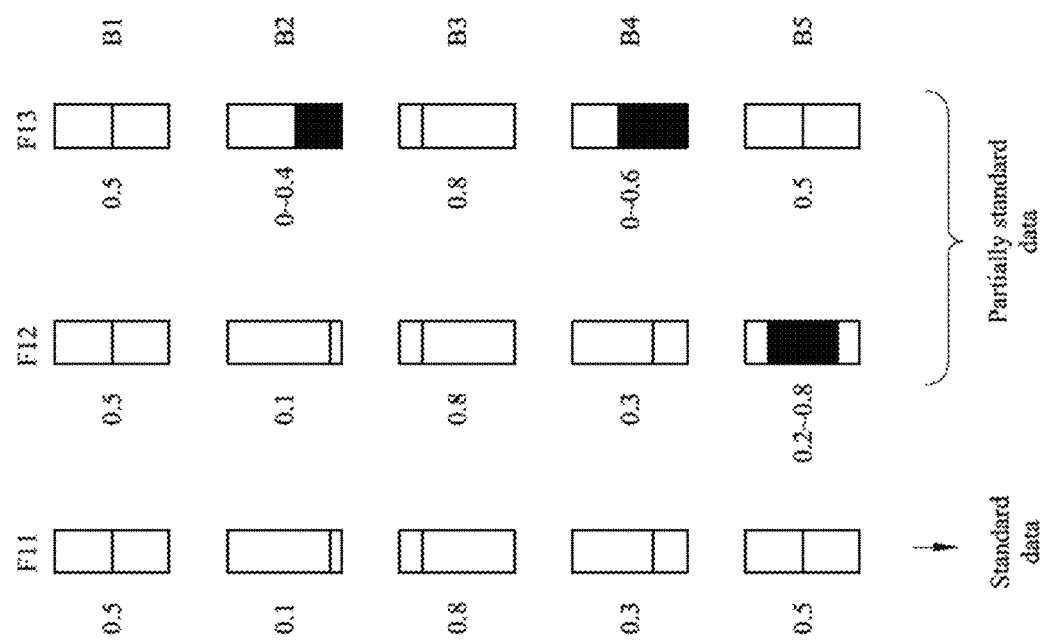
FIG. 5C is a schematic diagram of the bits of feature data in accordance with some embodiments of the present disclosure.

FIG. 5C is a schematic diagram of the bits B1-B5 of the feature data F11-F13 in accordance with some embodiments of the present disclosure. The embodiment of FIG. 5C is similar to the embodiment of FIG. 5B. The difference is that each of the bits that is different between the partially standard data (e.g., the feature data F12, F13) and the standard data (e.g., the feature data F11) has a bit value range, and the bit value of the corresponding bit of the standard data is within this bit value range. For example, the bit B5 of the feature data F12 is different from the bit B5 of the feature data F11 (i.e., the standard data). In this case, the bit B5 of the feature data F12 will have a bit value range between 0.2 and 0.8, and the bit value 0.5 of the bit B5 of the feature data F11 is within this bit value range (i.e., 0.2-0.8). In some embodiments, the bit value range may be between 0 and 1 (i.e., a wildcard bit), in which case this bit will always be matched when receiving input data of any bit value.

Figure 5D:
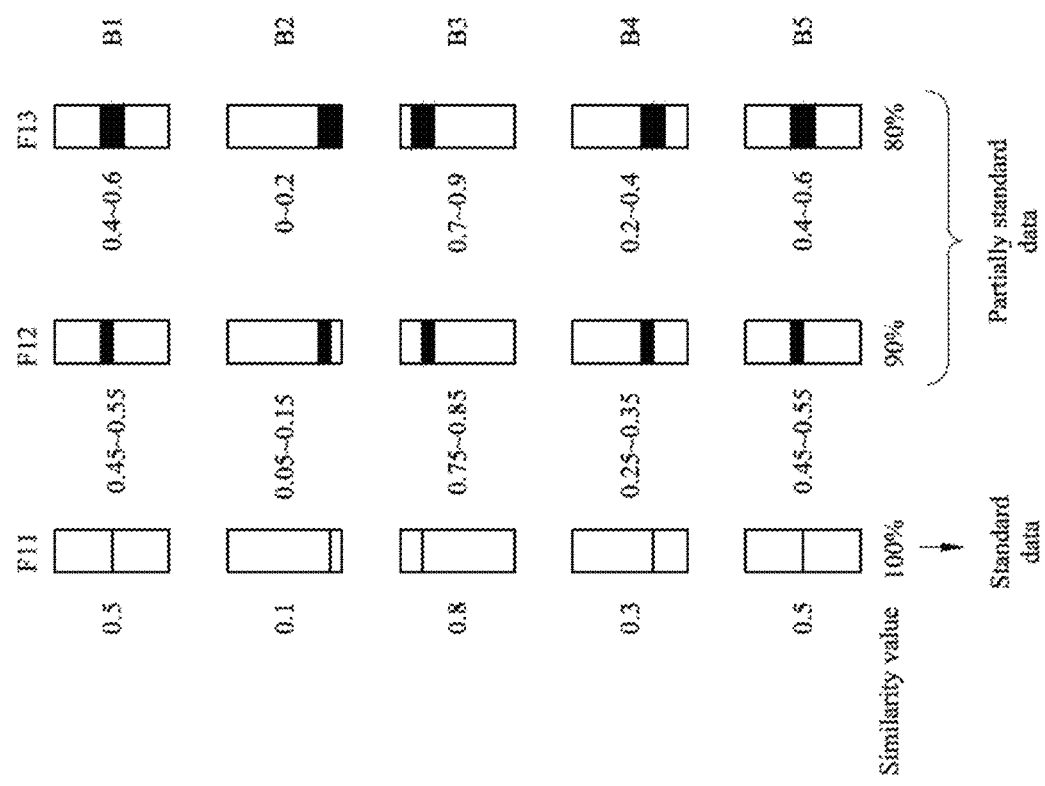
FIG. 5D is a schematic diagram of the bits of feature data in accordance with some embodiments of the present disclosure.

FIG. 5D is a schematic diagram of the bits B1-B5 of the feature data F11-F13 in accordance with some embodiments of the present disclosure. The embodiment of FIG. 5D is similar to the embodiment of FIG. 5C. The difference is that all bits of the partially standard data (e.g., the feature data F12, F13) have a bit value range, and this bit value range is related to the corresponding similarity value. For example, since the similarity value of the feature data F12 is 90%, the bit value range of each bit of the feature data F12 is between the bit values of the feature data F11 (i.e., the standard data) plus and minus 0.05 (i.e., ±5% of 1); since the similarity value of the feature data F13 is 80%, the bit value range of each bit of the feature data F13 is between the bit values of the feature data F11 plus and minus 0.1 (i.e., ±10% of 1).

With the above configurations of the bits of the standard data and partially standard data, the configurations of data content can become more flexible, and these configurations can also help to improve the accuracy of data matching.

Figure 6:
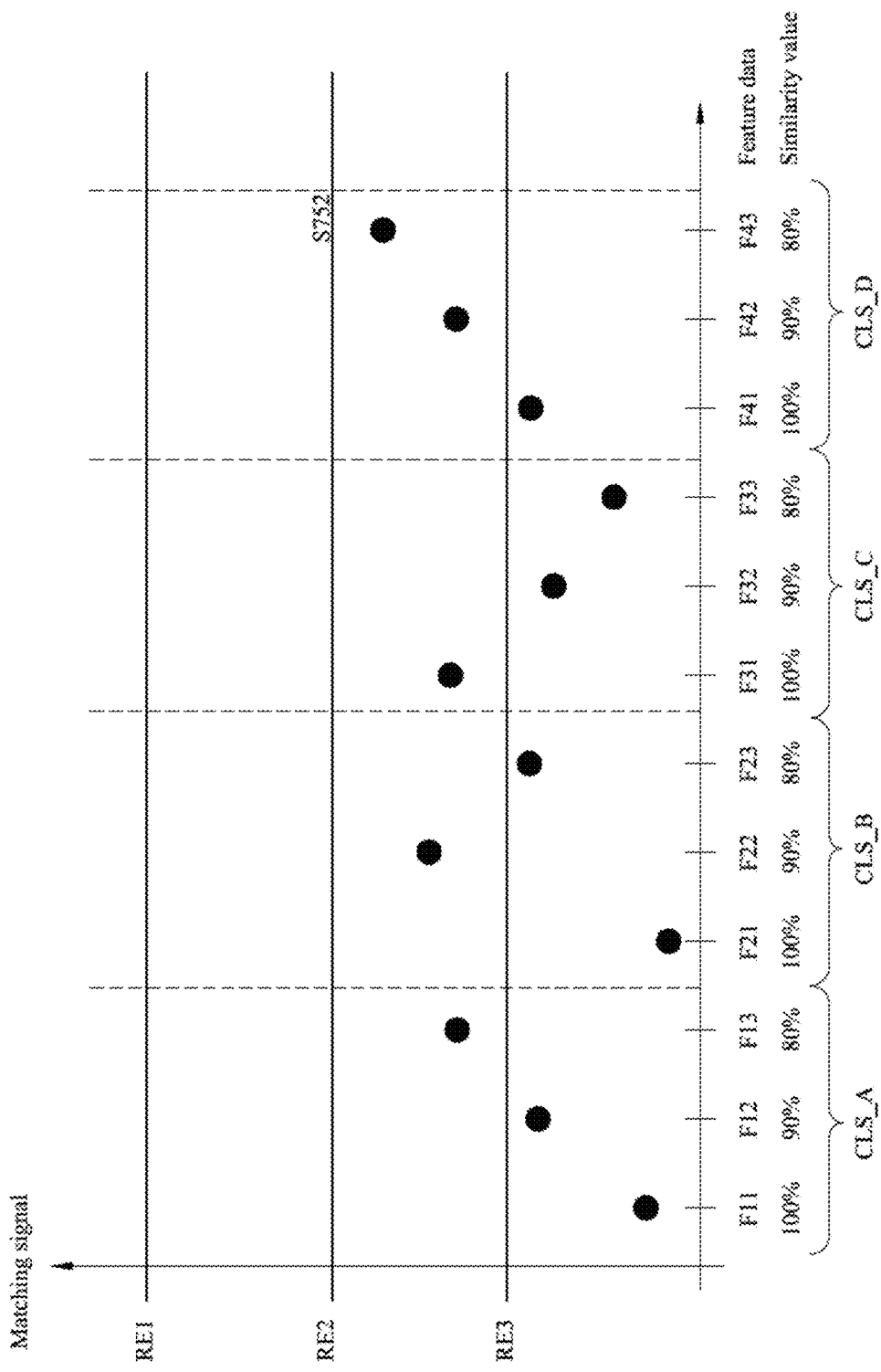
FIG. 6 is a schematic diagram of the matching signals of feature data in accordance with some embodiments of the present disclosure.

FIG. 6 is a schematic diagram of the matching signals of the feature data F11~F13, F21~F23, F31~F33, and F41~F43 in accordance with some embodiments of the present disclosure. The detailed operation of data matching by the database circuit 100 will be described below with reference to FIG. 6.

Operationally, when the database circuit 100 receives the query data QUE, the processing circuit SA will match the query data QUE with all of the feature data, and generate matching signals (e.g., voltage, current, etc.) with corresponding amplitudes respectively. Next, the processing circuit SA selects the largest one of the matching reference values as the target reference value, and compares all the matching signals with the target reference value.

When at least one of the matching signals is greater than or equal to the target reference value, the processing circuit SA determines that there is feature data matching the query data QUE, and outputs a feature data class as a matching result RES. On the contrary, when all of the matching signals are lower than the target reference value, the processing circuit SA will select the second largest one of the matching reference values as the target reference value, and compare all of the matching signals with the newly selected target reference value again. When all of the matching signals are still lower than the new target reference value, the processing circuit SA will select the third largest one of the matching reference values as the target reference value, and so on. When all of the matching signals are lower than the smallest one of the matching reference values, the processing circuit SA will determine that the query data QUE does not match all of the feature data.

Take the embodiment in FIG. 6 as an example, first, the processing circuit SA matches the query data QUE with the feature data F11-F13, F21-F23, F31-F33, F41-F43, and generates matching signals with corresponding amplitudes respectively. Next, the processing circuit SA selects the matching reference value RE1 as the target reference value and compares all of the matching signals with the target reference value. Since all of the matching signals are lower than the matching reference value RE1, the processing circuit SA then selects the matching reference value RE2 as the new target reference value. Since all of the matching signals are still lower than the matching reference value RE2, the processing circuit SA then selects the matching reference value RE3 as the new target reference value. At this time, since the matching signals of the feature data F13, F22, F31, F42, and F43 are greater than the matching reference value RE3, the processing circuit SA will output one of the feature data classes as the matching result RES.

In some embodiments, among the matching signals that are greater than the target reference value, the processing circuit SA will select the feature data class to which the feature data with the highest similarity value belongs as the matching result RES. Take the embodiment in FIG. 6 as an example, among the feature data F13, F22, F31, F42, and F43 whose matching signal is greater than the matching reference value RE3 (i.e., the target reference value), since the feature data F31 has the highest similarity value (i.e., 100%), the processing circuit SA will select the feature data class CLS_C to which the feature data F31 belongs as the matching result RES.

In some embodiments, among all of the feature data classes, the processing circuit SA will select the feature data class with the largest number of feature data whose matching signals are greater than the target reference value as the matching result RES. Take the embodiment in FIG. 6 as an example, among the feature data classes CLS_A-CLS_D, the feature data classes CLS_A-CLS_C each have one feature data whose matching signal is greater than the target reference value, and the feature data class CLS_D has two feature data whose matching signals are greater than the target reference value, so the processing circuit SA will select the feature data class CLS_D as the matching result RES.

It should be noted that the number of the matching reference values RE1-RE3 in FIG. 6 is only an example, and is not intended to limit the present disclosure. Other numbers of matching reference values are within the scope of the present disclosure.

In some embodiments, the abovementioned matching method of the query data QUE and the feature data can also be applied to multiple database circuits (e.g., a comprehensive database circuit formed by the database circuit 100 and other database circuits). For example, the processing circuit SA can first perform matching based on the query data QUE and the feature data stored in the database circuit 100. When the query data QUE does not match the feature data in the database circuit 100, the processing circuit SA can then perform matching based on the query data QUE and the feature data stored in the second database circuit, and so on, until the processing circuit SA finds the feature data that matches the data QUE, or all of the database circuits have been searched.

Figure 7:
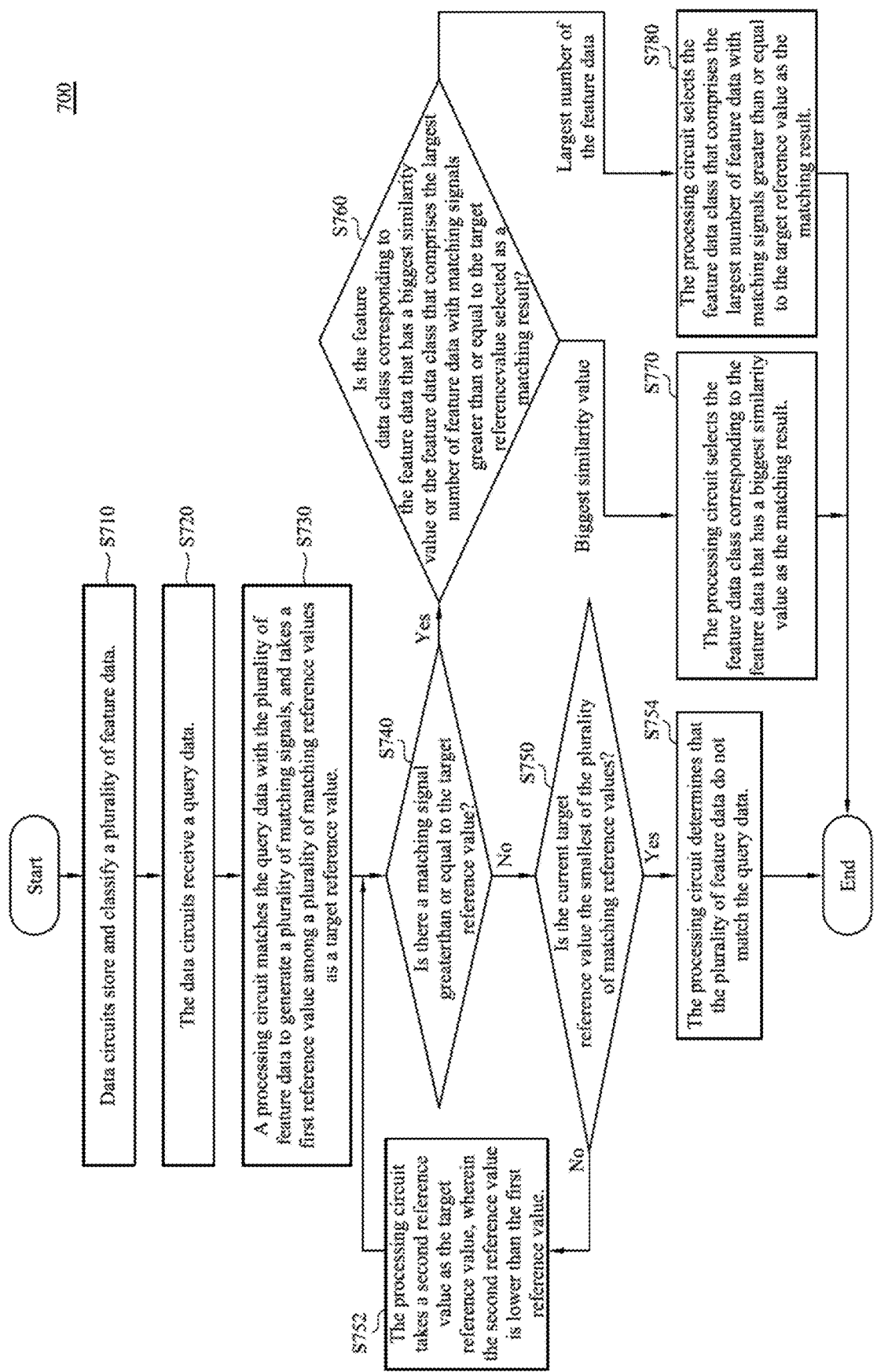
FIG. 7 is a flowchart of a data matching method in accordance with some embodiments of the present disclosure.

FIG. 7 is a flowchart of a data matching method 700 in accordance with some embodiments of the present disclosure. In some embodiments, the data matching method 700 is suitable for a database circuit (e.g., the database circuit 100) and comprises steps S710, S720, S730, S740, S750, S752, S754, S760, S770 and S780.

In step S710, a plurality of feature data are stored and classified (e.g., in the configuration shown in FIGS. 3A-4E) by a plurality of data circuits in the database circuit. Next, step S720 will be performed.

In step S720, a query data is received by the plurality of data circuits. Next, step S730 will be performed. In step S730, a matching between the query data and the plurality of feature data is performed by a processing circuit of the database circuit to generate a plurality of matching signals, and a first reference value among a plurality of matching reference values is selected as a target reference value. Next, step S740 will be performed.

In step S740, the processing circuit determines whether there is a matching signal greater than or equal to the target reference value. When the processing circuit determines that there is no matching signal greater than or equal to the target reference value, step S750 will be performed; when the processing circuit determines that there is a matching signal greater than or equal to the target reference value, step S760 will be performed.

In step S750, the processing circuit determines whether the current target reference value is the smallest one of the matching reference values. When the current target reference value is not the smallest one of the matching reference values, step S752 will be performed; when the current target reference value is the smallest one of the matching reference values, step S754 will be performed.

In step S752, the processing circuit takes a second reference value among the plurality of matching reference values as the new target reference value, wherein the second reference value is lower than the first reference value. Next, step S740 will be performed again.

In step S754, since all of the matching signals are lower than the matching reference value, the processing circuit determines that the query data does not match the plurality of feature data.

In step S760, the processing circuit determines whether to select the feature data class corresponding to the feature data that has a biggest similarity value as the matching result, or to select the feature data class that comprises the largest number of feature data with matching signals greater than or equal to the target reference value as the matching result. When the processing circuit selects the feature data class corresponding to the feature data that has a biggest similarity value as the matching result, step S770 will be performed; when the processing circuit selects the feature data class that comprises the largest number of feature data with matching signals greater than or equal to the target reference value as the matching result, step S780 will be perform.

In step S770, the processing circuit selects the feature data class corresponding to the feature data that has a biggest similarity value as the matching result, and outputs the matching result. In step S780, the processing circuit selects the feature data class that comprises the largest number of feature data with matching signals greater than or equal to the target reference value as the matching result, and outputs the matching result.

It should be noted that the number and sequence of steps in the data matching method 700 of the present disclosure are only examples, and are not intended to limit the present disclosure. Other numbers and sequences of steps are within the scope of the present disclosure. In some embodiments, step S710 and step S720 may be performed simultaneously. In some embodiments, an additional step may be performed between step S750 and step S754. In this additional step, the processing circuit determines whether the feature data in all database circuits have been compared. When there are still database circuits that have not been compared, the processing circuit switches to the next database circuit for comparison and step S730 will be performed again; when the processing circuit has compared all of the database circuits, step S754 will be performed.

Through the database circuit 100 and the data matching method 700 of the present disclosure, feature data can be stored in the database circuit in various configurations and be searched in various ways. In addition to reducing the complexity and time required for searching, they can also improve the accuracy of searching.

The above are preferred embodiments of the present disclosure. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A database circuit, comprising:
a plurality of data circuits, configured to respectively store a plurality of feature data and receive a query data, wherein the plurality of feature data form at least one feature data class; and
a processing circuit, coupled to the plurality of data circuits, and configured to match the query data with the plurality of feature data to generate a plurality of matching signals and take a first reference value among a plurality of matching reference values as a target reference value to compare the plurality of matching signals with the target reference value,
wherein each feature data class comprises at least one sub-feature class, each sub-feature class comprises at least one of the plurality of feature data, and each of the plurality of feature data comprises a plurality of bits,
wherein in each sub-feature class, the plurality of bits of the at least one of the plurality of feature data are at least partially different from a plurality of bits of a standard data,
wherein when at least one of the plurality of matching signals is greater than or equal to the target reference value, the processing circuit is configured to select one of the at least one feature data class as a matching result, and
when the plurality of matching signals are lower than the target reference value, the processing circuit is configured to take a second reference value among the plurality of matching reference values as the target reference value to compare the plurality of matching signals with the target reference value, wherein the second reference value is lower than the first reference value.

2. The database circuit of claim 1, wherein when the plurality of matching signals are lower than the plurality of matching reference values, the processing circuit is configured to determine that the plurality of feature data do not match the query data.

3. The database circuit of claim 1, wherein each of the plurality of bits of the standard data is of a bit value "0" or a bit value "1", and each of the plurality of bits of the plurality of feature data is of the bit value "0", the bit value "1" or a wildcard bit, and
wherein at least one of the plurality of bits of the at least one feature data is different from the corresponding at least one of the plurality of bits of the standard data.

4. The database circuit of claim 1, wherein each of the plurality of bits of the plurality of feature data and the standard data has a bit value, and
wherein at least one of the plurality of bit values of the at least one feature data is different from the corresponding at least one of the plurality of bit values of the standard data.

5. The database circuit of claim 1, wherein each of the plurality of bits of the standard data has a bit value, and
wherein each of the plurality of bits of the plurality of feature data has a bit value range, and each bit value of the standard data is within the bit value range of the corresponding one of the plurality of bits of the plurality of feature data.

6. The database circuit of claim 1, wherein at least one of the plurality of bits of the at least one feature data is different from corresponding at least one of the plurality of bits of the standard data, and
wherein the at least one of the plurality of bits of the at least one feature data is randomly configured or configured by design.

7. The database circuit of claim 1, wherein the standard data is stored in the at least one feature data class, and the processing circuit is further configured to match the query data with the standard data to generate the plurality of matching signals.

8. The database circuit of claim 1, wherein each of the plurality of feature data has a similarity value to indicate the degree of similarity between the plurality of feature data and the standard data, and
when the at least one of the plurality of matching signals is greater than or equal to the target reference value, the processing circuit is configured to select the feature data class corresponding to one of the at least one feature data corresponding to the at least one matching signal that has a biggest similarity value as the matching result.

9. The database circuit of claim 1, wherein when at least one of the plurality of matching signals is greater than or equal to the target reference value, the processing circuit is configured to select the feature data class that comprises the largest number of the at least one feature data corresponding to the at least one of the plurality of matching signals as the matching result.

10. A data matching method suitable for a database circuit comprising a plurality of data circuits and a processing circuit, wherein the data matching method comprises:
storing, by the plurality of data circuits, a plurality of feature data which form at least one feature data class, comprising:
classifying, by the plurality of data circuits, at least one sub-feature class in each feature data class, wherein each sub-feature class comprises at least one of the plurality of feature data, and each of the plurality of feature data comprises a plurality of bits;
receiving, by the plurality of data circuits, a query data;
matching, by the processing circuit, the query data with the plurality of feature data, to generate a plurality of matching signals;
taking, by the processing circuit, a first reference value among a plurality of matching reference values as a target reference value, to compare the plurality of matching signals with the target reference value;
in response to at least one of the plurality of matching signals being greater than or equal to the target reference value, selecting, by the processing circuit, one of the at least one feature data class as a matching result; and
in response to the plurality of matching signals being lower than the target reference value, taking, by the processing circuit, a second reference value among the plurality of matching reference values as the target reference value, to compare the plurality of matching signals with the target reference value,
wherein in each sub-feature class, the plurality of bits of the at least one of the plurality of feature data are at least partially different from a plurality of bits of a standard data, and
wherein the second reference value is lower than the first reference value.

11. The data matching method of claim 10, further comprising:
in response to the plurality of matching signals being lower than the plurality of matching reference values, determining, by the processing circuit, that the plurality of feature data do not match the query data.

12. The data matching method of claim 10, wherein each of the plurality of bits of the standard data is of a bit value "0" or a bit value "1", and each of the plurality of bits of the plurality of feature data is of the bit value "0", the bit value "1" or a wildcard bit, and
wherein at least one of the plurality of bits of the at least one feature data is different from the corresponding at least one of the plurality of bits of the standard data.

13. The data matching method of claim 10, wherein each of the plurality of bits of the plurality of feature data and the standard data has a bit value, and
wherein at least one of the plurality of bit values of the at least one feature data is different from the corresponding at least one of the plurality of bit values of the standard data.

14. The data matching method of claim 10, wherein each of the plurality of bits of the standard data has a bit value, and
wherein each of the plurality of bits of the plurality of feature data has a bit value range, and each bit value of the standard data is within the bit value range of the corresponding one of the plurality of bits of the plurality of feature data.

15. The data matching method of claim 10, wherein storing, by the plurality of data circuits, the plurality of feature data further comprises:
configuring, by the plurality of data circuits, at least random one of the plurality of bits of the at least one feature data to be different from corresponding at least one of the plurality of bits of the standard data; or
configuring, by the plurality of data circuits, at least designed one of the plurality of bits of the at least one feature data to be different from corresponding at least one of the plurality of bits of the standard data.

16. The data matching method of claim 10, further comprising:
storing, by the plurality of data circuits, the standard data, in the at least one feature data class; and
matching, by the processing circuit, the query data with the standard data, to generate the plurality of matching signals.

17. The data matching method of claim 10, wherein each of the plurality of feature data has a similarity value to indicate the degree of similarity between the plurality of feature data and the standard data, and selecting, by the processing circuit, the one of the at least one feature data class as the matching result comprises:
selecting, by the processing circuit, the feature data class corresponding to one of the at least one feature data corresponding to the at least one matching signal that has a biggest similarity value, as the matching result.

18. The data matching method of claim 10, wherein selecting, by the processing circuit, the one of the at least one feature data class as the matching result comprises:
selecting, by the processing circuit, the feature data class that comprises the largest number of the at least one feature data corresponding to the at least one of the plurality of matching signals, as the matching result.

* * * * *